(12) United States Patent
Shimazaki (10) Patent No.: US 6,546,849 B1
(45) Date of Patent: Apr. 15, 2003

(54) COOKING SYSTEM WITH REVERSIBLE MULTI-FUNCTION TOP

(76) Inventor: J. John Shimazaki, 47799 MacGill Ct., Sterling, VA (US) 20165

( * ) Notice: Subject to any disclaimer, the term of this patent is extended or adjusted under 35 U.S.C. 154(b) by 154 days.

(21) Appl. No.: 09/691,230

(22) Filed: Oct. 19, 2000

Related U.S. Application Data (60) Provisional application No. 60/161,600, filed on Oct. 26, 1999.

(51) Int. Cl.[7] .......................... A47J 27/00; A47J 27/04; A47J 37/06
(52) U.S. Cl. .............................. 99/413; 99/403; 99/410; 99/450; 210/465; 210/469
(58) Field of Search ........................... 99/413, 410, 411, 99/412, 414, 450, 340, 339; 210/464, 465, 469; 220/912

(56) References Cited

U.S. PATENT DOCUMENTS

| | | |
|---|---|---|
| 1,688,846 A | 10/1928 | Andrews |
| 2,185,897 A | 1/1940 | Krause et al. |
| 2,215,607 A | 9/1940 | Eastwood |
| 2,541,094 A | 2/1951 | Pesenti |
| 2,667,976 A | 2/1954 | Weidner |
| 4,025,435 A | 5/1977 | Shea |
| 4,153,045 A | 5/1979 | Phelon |
| 4,220,534 A | 9/1980 | Perry |
| 4,604,989 A * | 8/1986 | Kita .......................... 99/413 X |
| 4,626,352 A | 12/1986 | Massey et al. |
| 4,714,012 A * | 12/1987 | Hernandez ................ 99/410 X |
| 5,178,761 A | 1/1993 | Mohun |
| D347,964 S | 6/1994 | Davis |
| 5,373,779 A | 12/1994 | Grusin |
| 5,771,792 A | 6/1998 | Chen |
| 5,853,581 A | 12/1998 | Rayborn et al. |
| 6,055,901 A * | 5/2000 | Gantos et al. ................. 99/412 |

* cited by examiner

Primary Examiner—Reginald L. Alexander

(57) ABSTRACT

The present invention relates to an improved cooking system having a conventional style pot using a reversible multi-function top. The system comprises a pot, a reversible top and lid, which can be used individually and collectively, to function as a cooking pot, colander, steamer and strainer. One of the improvements consists of the top and pot each having two handles to enable the top to be held securely with two hands when placed up-side-down on top of the pot. This way, the handles do not have to engage and/or mate with one another, standard off-the-shelf handles can be used, and a new top can be retrofitted to fit an existing pot with matching handles (since the handles do not have to be specially designed). A specially designed lid can also be used that is self-centering on the pot and top.

14 Claims, 5 Drawing Sheets

COOKING SYSTEM WITH REVERSIBLE MULTI-FUNCTION TOP

RELATED APPLICATIONS

This application claims priority from U.S. Provisional Application Serial No. 60/161,600, filed Oct. 26, 1999.

FIELD OF THE INVENTION

The present invention relates to cookware, and in particular, to a method and apparatus for improving the functionality of a cooking pot using a multi-function top.

BACKGROUND OF THE INVENTION

Many types of pots are used to boil food, such as pasta, vegetables, etc. Deep pots that have sturdy handles, for example, are commonly used to cook pasta and vegetables, and in particular, long noodles such as spaghetti. Typically, when food is boiled, a strainer or colander is required to drain water. In the absence of a strainer or colander, resort is sometimes made to using a dish, or fork, or some other means, to hold food in the pot. The problem, however, is that food can easily be dropped, and steam burns are a common occurrence.

Recently, pasta cookers, as they are commonly known, have become popular. A pasta cooking insert, with perforations, is essentially a "pot within a pot," used to cook food, as well as drain it. Typically, food is placed into the insert, which is then placed into the pot, and, after the food is cooked, the insert is removed, allowing water to drain through the perforations. Pasta cookers, however, take longer and use more energy because more water must be boiled in the pot. Moreover, they cannot be used as a strainer.

Vegetable steamers have also become popular. Steamer inserts fit inside pots, and have perforations to allow steam to pass. A lid covers the pot and insert to trap steam inside. Although steamer inserts are sometimes used as colanders, the same problems exist, i.e., food can easily be dropped, and steam burns are a common occurrence. Also, steamer inserts cannot be used as strainers.

SUMMARY OF THE INVENTION

To overcome the above deficiencies, a cooking pot with a reversible multi-function top was developed, as described in U.S. application Ser. No. 09/006,890, which issued as U.S. Pat. No. 5,957,038, and which is incorporated herein by reference. In that application, a cooking system that provides the functions and advantages of conventional pots, strainers, colanders and steamers, in one system, was disclosed. The disclosed system comprised a reversible multi-function top, with perforations, which could be positioned on top of the pot, either right-side-up or up-side down, wherein the pot and top had handles that engaged and/or mated with one another so that they can be held with one hand.

The present invention also represents an improvement over previous cooking systems in that it also preferably provides the functions and advantages of conventional pots, strainers, colanders and steamers, in one system, and uses a reversible multi-function top, with perforations, which can preferably be positioned on top of the pot, either right-side-up or up-side down. When the pot is used by itself with a lid, it preferably functions as a standard cooking pot. When the top is used by itself, it preferably functions as a colander. When the top is used right-side-up on top of the pot with a lid, it preferably functions as a steamer. And, when the top is positioned up-side-down on top of the pot, it preferably functions as a strainer.

In the present invention, both the pot and top preferably have two handles each, wherein the handles are configured and adapted so that when the top is positioned up-side-down on top of the pot, and aligned properly, the handles that correspond to each other can be easily grasped with two hands. That is, one hand can be used to hold one of the pot's handles together with one of the top's handles, and the other hand can be used to hold the other of the pot's handles together with the other of the top's handles. This enables the pot and top to be held securely together by applying pressure with two hands during straining. This can also be advantageous where relatively large pots, i.e., such as larger than 3 quarts, are used, insofar as greater pressure can be applied to keep the pot and top together while straining.

In another aspect, when the top is positioned up-side-down on top of the pot, the handles only need to be positioned in close proximity to each other, i.e., they don't necessarily have to engage each other. The space between the handles can make them easier to grasp insofar as the space can provide the proper distance between the fingers and thumb for a secure grip. The handles can otherwise be configured in virtually any manner that allows them to be grasped together without having to engage and/or mate with one another.

In another aspect, precision is not needed to position and locate the handles on the pot and top, i.e., manufacturing tolerances don't need to be strict. The corresponding handles only have to be configured and located so that they can be positioned close enough to each other so that when the top is positioned up-side-down on top of the pot, the handles can be held with two hands. While incidental contact between the handles is allowed, there is otherwise no need to locate the handles where they can engage and/or mate with each other.

In another aspect, standard off-the-shelf rod or loop-style handles can be used which are ideal for large pots. Rod style handles are sturdy and can be held securely with two hands, even when heavy food items or water is placed in the pot. In this respect, no speciallized handles are required on the pot or top.

The present invention can also easily be adapted with handles that are the same as those found on an existing pot. Because the handles do not have to engage one another, the top's handles can have the same design as the existing pot's handles. This way, the top can easily be retrofitted to match the design of an existing pot or set. The present invention even allows the top to be provided as a separate add-on item, since the same handles on the existing design can be used.

The pot of the present invention is preferably configured having a bottom floor and substantially cylindrical sidewalls. The pot preferably has a rim onto which the top can be fitted, either right-side-up or up-side-down, and two handles extending from either side.

The multi-function top preferably has a rim, intermediate portion and perforated body portion. The top's rim is preferably adapted such that the top can be positioned on the pot's rim to allow the top to be used as a strainer. The body portion is preferably adapted such that it can be positioned inside the pot's rim, and supported right-side-up on top of the pot, so that it can be used as a steamer. The top can be used by itself as a colander. The top's handles preferably extend from the intermediate portion.

The present invention contemplates various designs for supporting the top on the pot so that a secure fit can be provided. In one embodiment, the intermediate portion has upper and lower raised portions to allow the top to rest up-side-down or right-side-up on top of the pot. The top's rim fits in the pot's rim, and the upper and lower raised portions have diameters greater than that of the pot's rim, so that the top can be supported in either direction. In another embodiment, the top and pot have rims that are tapered to fit so that the top can be positioned on the pot either right-side-up or up-side-down with a friction fit. In another embodiment, the pot has an internal ledge which supports the top when positioned up-side-down on the pot, and the top has an external ledge which rests on the pot's internal ledge when positioned right-side-up. In another embodiment, the top has a rim capable of being mounted on the exterior of the pot's rim when positioned up-side-down. A ledge is provided on the body portion to support the top when positioned right-side-up.

The preferred lid design incorporates a rim having several annular sections, each one having a progressively smaller diameter. This design is adapted to enable the lid to fit on both the pot and top, and be centered on each one. The first annular section is adapted to rest on the pot's rim, and is preferably configured to match the angle and/or curve of that portion. The second annular section is adapted to rest on the upper edge of the top's rim when positioned on the top. The third annular section is adapted to fit inside the top's rim. This design is intended to be used with any multi-function top design, including the one handle design.

As discussed, the present invention preferably encompasses a method of retrofitting an existing pot with a new multi-function top having matching handles. This can be done by measuring the existing pot's rim and preferably adapting the new top to fit on top of the existing pot both right-side-up and up-side-down. Because the handles don't have to be specially designed, the same handles used on the pot can be used on the top. This way, the top can be sold as a separate add-on item if desired.

Although the preferred embodiments are discussed above, the present invention is, nevertheless, intended to encompass embodiments that are not specifically disclosed, as well as those having fewer than all of the features listed above. For example, the lid design of the present invention can be used in conjunction with any multi-function top design, including the previous one handle design.

DETAILED DESCRIPTION OF THE INVENTION

The present invention represents an improvement over previous cooking pots, strainers, colanders and steamers, as well as pasta cooking inserts and steamers, in that the present invention comprises a system that preferably combines a conventional style pot 1 for cooking, with a reversible multi-function top 2, having perforations 6, wherein top 2 and pot 1 can preferably be used individually or in combination to function as a pot, colander, steamer or strainer, in one.

Figure 4A:
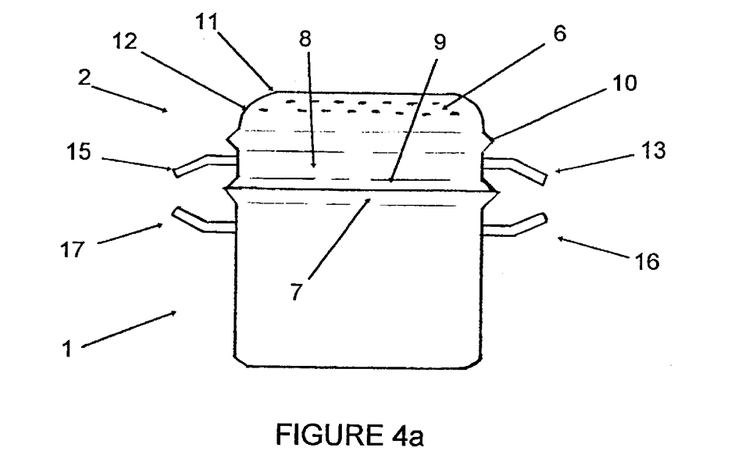
FIG. 4*a* shows the top positioned up-side-down on top of the pot with a space between the handles.
Figure 4B:
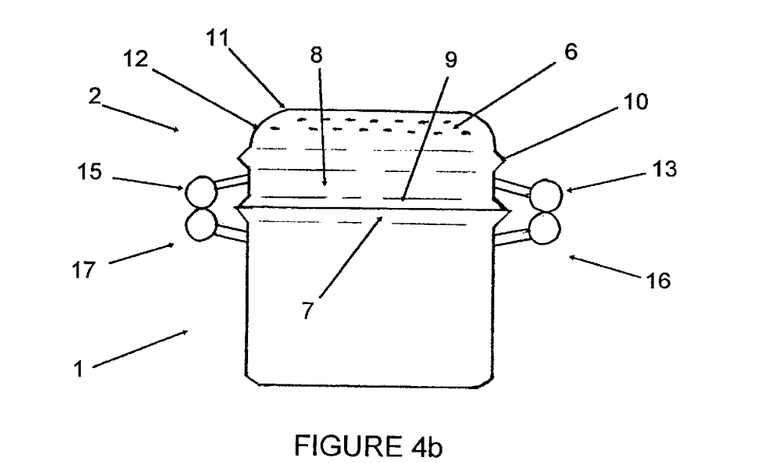
FIG. 4*b* shows the top positioned up-side-down on top of the pot with wider handles where there is incidental contact between the handles.
Figure 5:
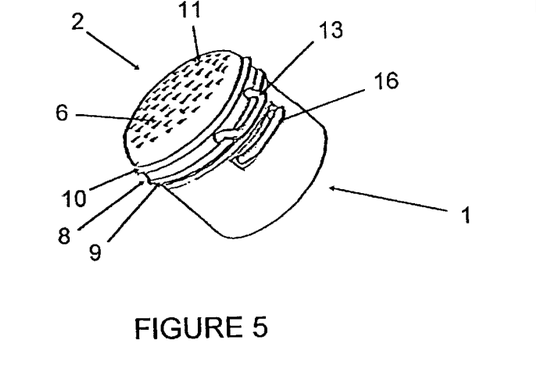
FIG. 5 shows the top being used as a strainer.

The top 2 preferably has two handles 13, 15, and the pot 1 preferably has two handles 16, 17, so that when top 2 is placed up-side-down on top of pot 1, as shown in FIGS. 4–5, the handles 13, 16, 15, 17 can be grasped with two hands for easy straining. The handles are preferably adapted so that when top 2 is positioned up-side-down on top of pot 1, each set of handles (when the pot and top are aligned properly) can be held together with one hand. For example, one hand can be used to hold handles 13 and 16 together, and the other hand can be used to hold handles 15 and 17 together, thereby enabling pot 1 and top 2 to be easily grasped together with two hands.

Figure 1:
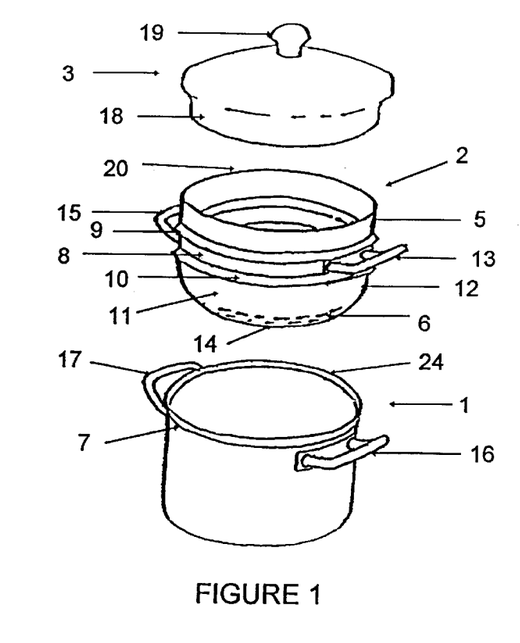
FIG. 1 shows the present invention with pot, top and lid.

Pot 1 of the present invention is much like any conventional cooking pot. It is preferably larger than 3 quarts, although it can be any conventional size. Pot 1 can be made in virtually any shape, although preferably, pot 1 has a flat bottom and cylindrical sidewalls, as shown in FIG. 1. Along the top of pot 1 is upper rim 7, which can be substantially cylindrical, angled (outward), curved, etc., with a top edge 24 that can have a straight or rolled edge, etc.

Figure 2:
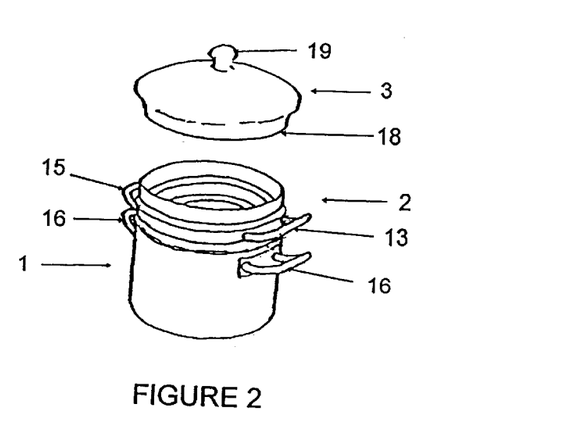
FIG. 2 shows the top positioned right-side-up on the pot and lid.
Figure 3:
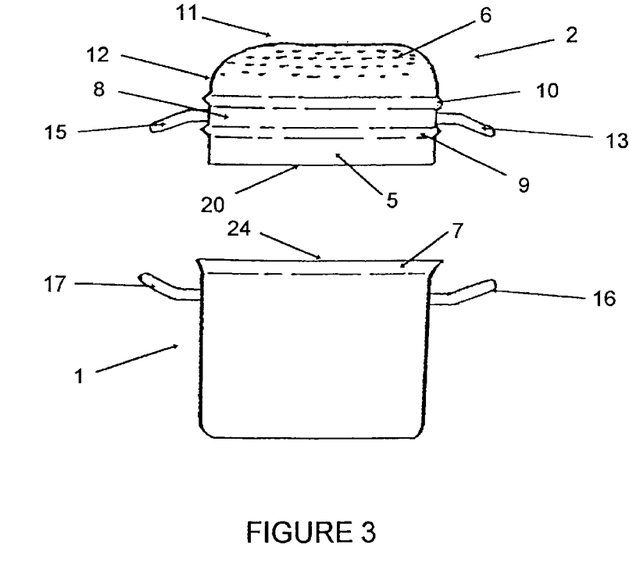
FIG. 3 shows the top positioned up-side-down over the pot.

Top 2, as shown in FIGS. 1–4, is preferably adapted so that it can be placed on top of pot 1, either right-side-up or up-side-down. "Right-side-up" refers to the top 2 as shown in FIG. 1, and "up-side-down" is the reverse position, as shown in FIG. 3. Terms "up" and "down," and "upper" and "lower," are used in relation to top 2 and pot 1 shown in FIG. 1, unless otherwise noted.

Top 2 preferably has an upper rim portion 5, a body portion 11 with perforations 6, and an intermediate portion 8 extending therebetween. Handles 13, 15 preferably extend from intermediate portion 8. Rim 5 is preferably substantially cylindrical and extends around the upper perimeter of top 2, wherein upper edge 20 can be reinforced if desired. Rim 5 is preferably wide (or deep) enough so that top 2 overlaps pot's rim 7 to some extent, which contributes to the overall size and volume of top 2. The outside diameter of rim 5 is preferably less than the inside diameter of pot's rim 7 so that when the top 2 is positioned up-side-down on top of pot 1, rim 5 fits inside pot's rim 7 as shown in FIGS. 4*a* and 4*b*.

The intermediate portion 8 preferably has an upper raised portion 9, as shown in the embodiments of FIGS. 1–4, extending around the perimeter, and a similar lower raised portion 10. Upper raised portion 9 preferably extends radially outward from rim 5, and lower raised portion 10 preferably extends radially outward from body portion 11. Raised portions 9, 10 preferably each have a diameter greater than the inside diameter of rim 7, and are prefereably curved and/or angled to match the curve and/or angle of the inside surface of the pot's rim 7, so that the top 2 can be supported either right-sideup or up-side-down on top of pot 1. The intermediate portion 8 between the upper and lower raised portions 9, 10 preferably has the same diameter as rim 5 or pot 7, but can have a different diameter.

Handles 13, 15 are preferably extended from intermediate portion 8, between upper and lower raised portions 9, 10, so that they do not interfere with the top's reversibility. Locating the handles preferably takes into account how far apart handles 13, 15 are to handles 16, 17 when top 2 is positioned up-side-down on top of pot 1. The preferred distance enables the handles to be held comfortably with two hands when top 2 is positioned up-side-down on top of pot 1, as shown in FIG. 4a. At the same time, specially designed handles that provide only incidental contact, as shown in FIG. 4b, which are wider and/or fatter but can be tightly grasped with two hands, are contemplated by the present invention. Like rim 5, intermediate portion 8 is part of top 2's sidewall, and therefore, contributes to the overall size and/or volume of top 2.

The body portion 11 extends below lower raised portion 10 and preferably includes an annular portion 12 sized to fit inside the pot's rim 7. Annular portion 12 preferably has an outside (maximum) diameter slightly less than the inside diameter of the pot's rim 7, so that when top 2 is positioned right-side-up on pot 1, as shown in FIG. 2, body portion 11 fits relatively snug in pot 1. Annular portion 12 is preferably curved inward, beginning from the lower raised portion 10, becoming smaller in diameter toward center 14.

Perforations 6 are preferably located on body portion 11 to allow water to drain or steam to pass. Perforations 6 can be any conventional size, but preferably small enough to help keep foods, such as small vegetables and pastas, from passing through. Perforations 6 are also preferably round, although other shapes, such as stars or crosses, can be used to allow more water to pass, while at the same time, helping to retain small food items. Each perforation 6 is preferably substantially the same size, although varying sizes can be used. Preferably, no perforations are provided on rim 5 or on intermediate portion 8 between the upper and lower raised portions 9, 10, so that steam will not escape when top 2 is positioned on pot 1.

Figure 6A:
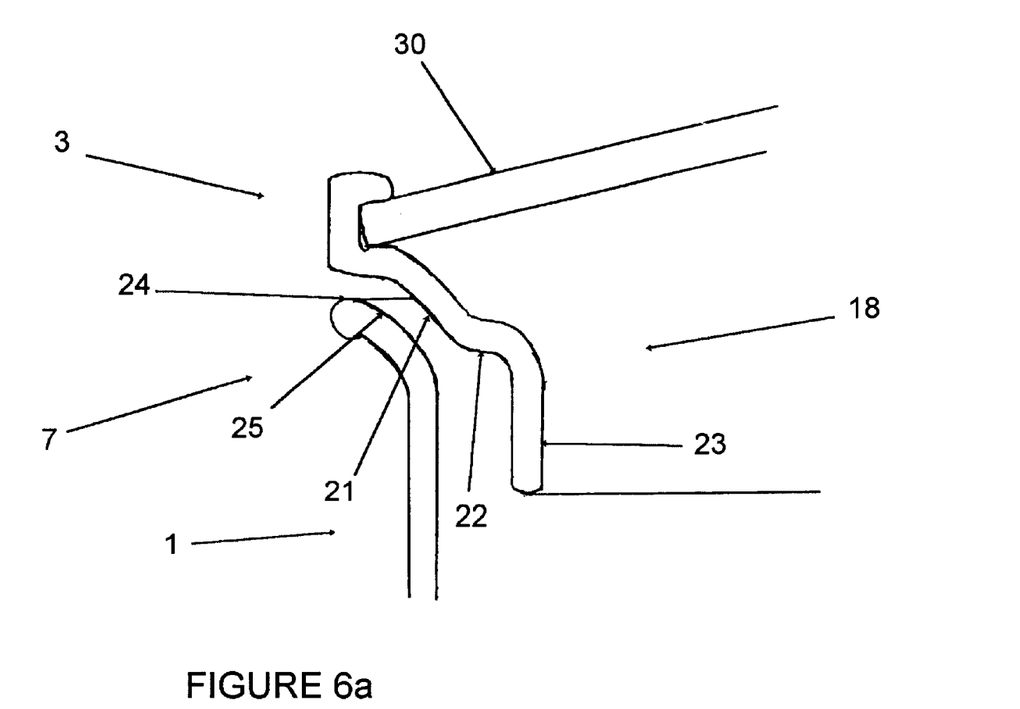
FIG. 6*a* shows a glass lid with curved rim.
Figure 6B:
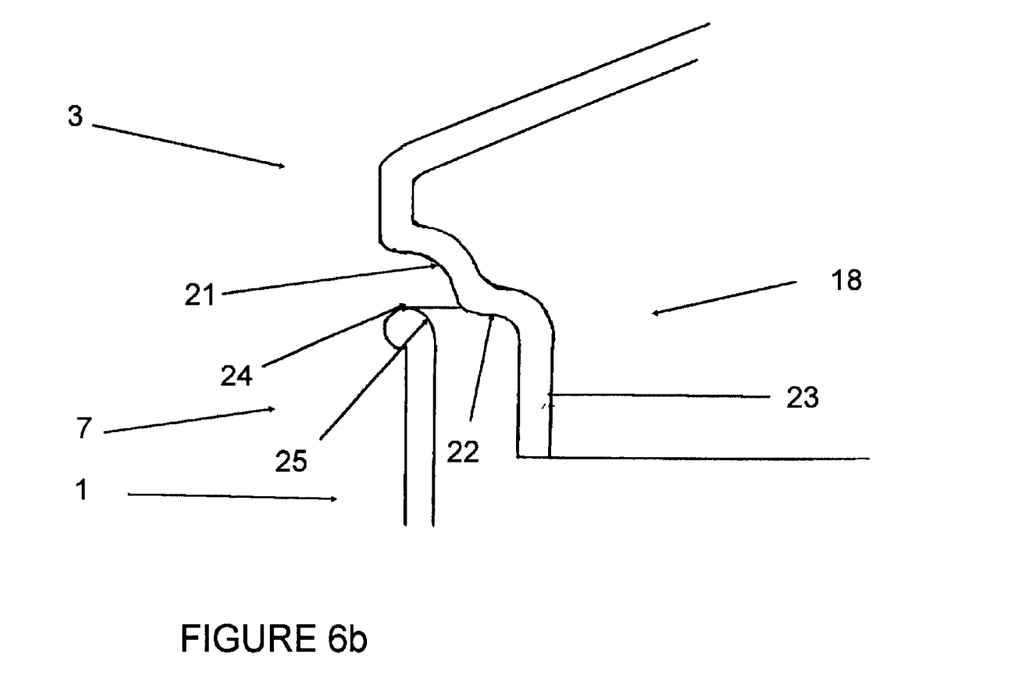
FIG. 6*b* shows a lid with curved rim.

Lid 3 preferably covers both the pot 1 and top 2. As shown in FIGS. 6a and 6b, lid 3 preferably has a rim 18 that has first, second, and third annular sections, 21, 22, and 23, respectively, each having progressively smaller diameters. The first annular section 21 is preferably configured to match the configuration of the inside surface 25 of the pot's rim 7, such that it can rest on top of the pot 1 in a manner that helps to center and secure lid 3 on the pot. In this respect, the first annular section 21 is preferably adapted to extend immediately above the upper edge 24 of the pot's rim 7 and preferably has an inwardly curved and/or angled surface that matches the inwardly curved and/or angled surface 25 of the pot's rim 7. The second annular section 22 is preferably adapted with an engaging surface that can rest on top of the upper edge 20 of the top's rim 5 when lid 3 is positioned on top of the top 2. The third annular section 23 is preferably adapted to extend substantially downward and inside the top's rim 5 for better drip down. The body of the lid preferably extends upwardly above the first annular section, and can be made of tempered glass 30, as shown in FIG. 6a, wherein the rim 18 can connect to and extend down from the edge of the glass. A knob 19 or other handle is preferably provided on top of lid 3. The lid 3 can be used in conjunction with any reversible multi-function top design, including the previous one handle design.

FIGS. 1–4 show handles 13, 15, 16, 17, which can be standard rod or loop-style handles connected to top 2 and pot 1, respectively. When standard rod style handles made of steel are used, they are preferably located so that a predetermined space exists between the handles as shown in FIG. 4a. The handles can also be made with conventional stay-cool materials, such as Bakelite, wherein depending on the thickness of the handles, incidental contact between the handles, as shown in FIG. 4b, is allowed. When the handles are at an angle, they are preferably adapted so that when top 2 is positioned on pot 1 right-side-up, all of the handles are oriented upward, as shown in FIGS. 1 and 2. And, when top 2 is positioned on pot 1 up-side-down, as shown in FIGS. 3 and 4, the top's handles 13, 15 are oriented downward toward the pot's handles 16, 17. The handles can also be oriented parallel to each other, or the reverse direction.

The top 2 and pot 1 preferably each have two handles, and therefore, pressure can be applied on both sides of the pot using two hands as leverage. In this respect, there is no need for the handles to engage one another to enable the user to hold the top securely on the pot. The handles only need to be in close proximity to each other, as shown in FIG. 4a, so that they can be held with two hands during straining. And, since the handles do not have to engage each other, the present design does not require the top 2 and pot 1 to be aligned for the handles to be held together, thereby eliminating the need for any self-alignment feature.

Figure 7:
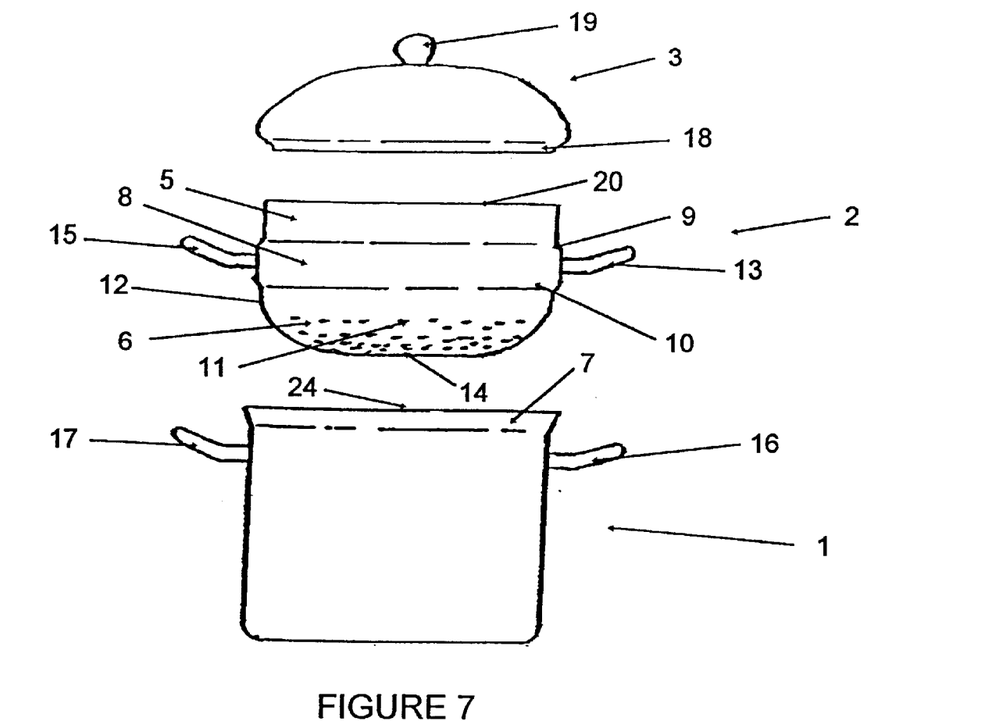
FIG. 7 shows an embodiment with a raised intermediate portion.

Other embodiments with different configurations are shown in FIGS. 7–10. FIG. 7 shows an embodiment where the intermediate portion 8 is a single annular portion with upper and lower ledges 9, 10 to support top 2 on pot 1. The area between the upper and lower ledges can be extended radially outward. Handles 13, 15 extend from intermediate portion 8, which allows top 2 to be reversible.

Figure 8:
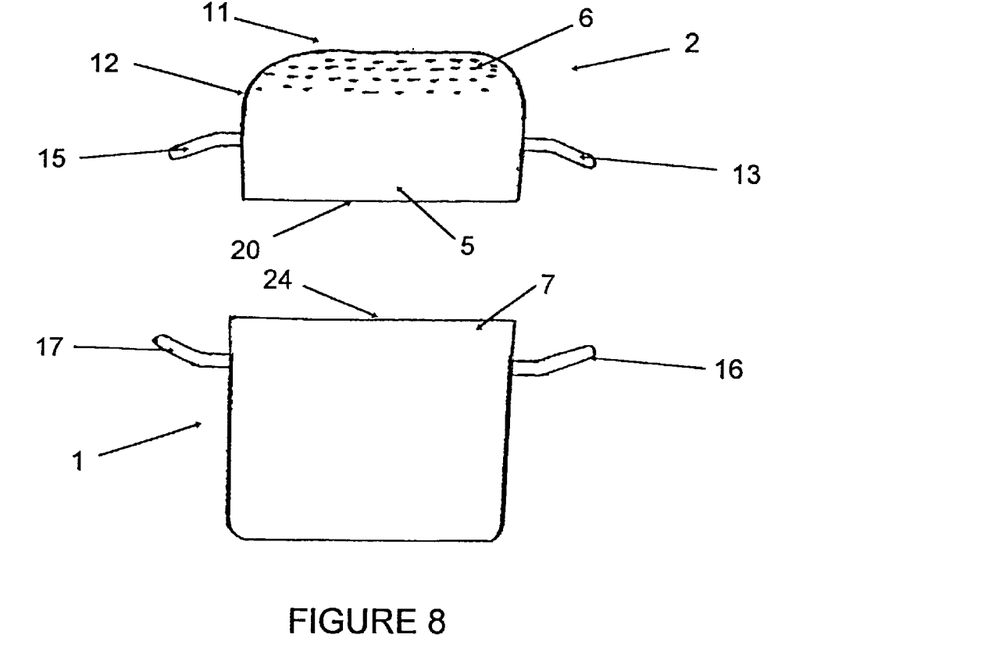
FIG. 8 shows an embodiment with tapered support areas.

FIG. 8 shows an embodiment where pot 1 and top 2 are adapted with a tapered fit so that top 2 can be supported on pot 1 either right-side-up or up-side-down by friction alone. Rim 5 and annular portion 12 on top 2 are preferably tapered inwardly such that they can fit inside the pot's rim 7 which is preferably tapered outwardly. In this way, top 2 can rest on pot 1 and be supported by frictional engagement without the need for well-defined supports.

Figure 9:
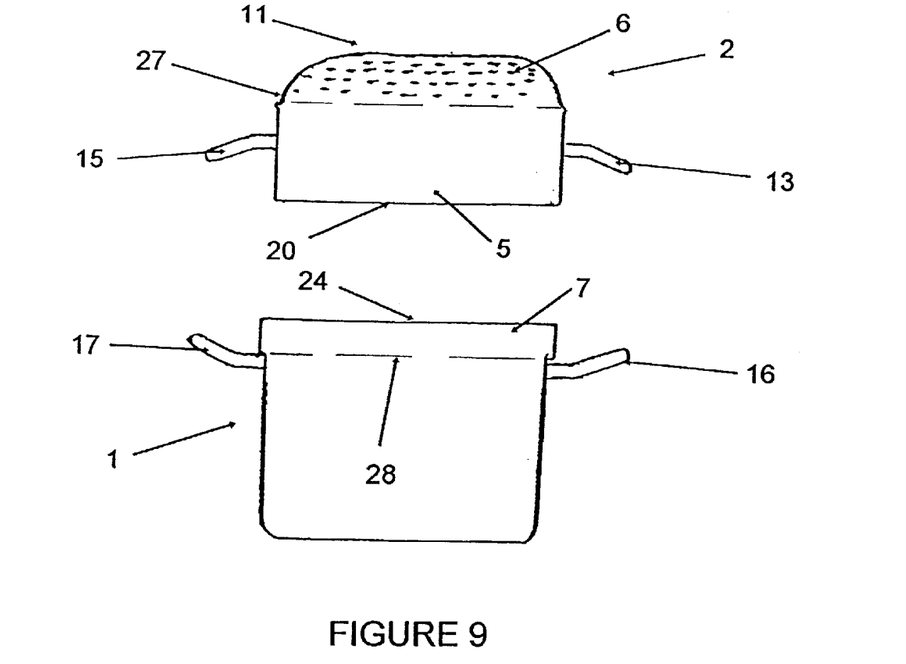
FIG. 9 shows an embodiment with internal and external ledges.

FIG. 9 shows an embodiment where pot 1 has an internal ledge 28 which supports the top's rim 5 when top 2 is positioned up-side-down on pot 1. Top 2 also has an external ledge 27 which engages the internal ledge 28 to support top 2 when right-side-up on pot 1. Rims 5, 7 are otherwise preferably cylindrical and can overlap each other when top 2 is up-side-down on pot 1. The distance between ledge 28 and the upper edge 24 of rim 7 is generally about half the distance between the ledge 27 and the upper edge 20 of rim 5, with handles 13, 15 extending from about the center between ledge 27 and upper edge 20 of rim 5.

Figure 10:
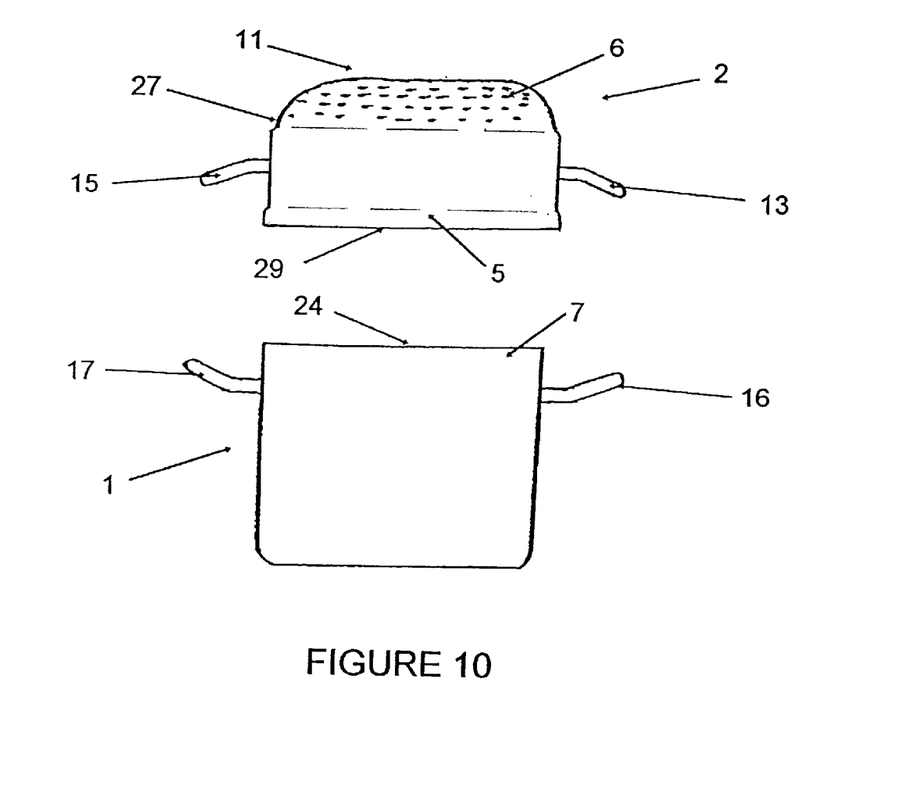
FIG. 10 shows an embodiment that mounts on the outside of the pot.

FIG. 10 shows an embodiment where top 2 has a rim portion 29 capable of being mounted on the exterior of the pot's rim 7. In this embodiment, handles 13, 15 extend from intermediate portion 8, and a ledge 27 is provided on top 2 which can engage pot's rim 7 when top 2 is positioned right-side-up on top of pot 1. In this way, top 2 can be positioned on pot 1 either right-side-up or up-side-down. The lid 3 in this embodiment has a slightly larger rim 18 so that it can fit on the top's rim 29 and pot's rim 7.

The present invention can be manufactured in any conventional manner. Pot 1, top 2 and lid 3 can be made of any strong, rigid, heat resistant material such as steel, aluminum, copper, or some combination, and are preferably made from stainless steel. Conventional non-stick materials can also be applied. The lid can also be made of tempered glass 30 with a stainless steel rim as shown in FIG. 6a. Handles 13, 15, 16, 17 and knob 19 can be made of any conventional material, such as stainless steel, and can be adapted with a Bakelite, plastic, or other suitable exterior to keep the handles cool. The handles can be connected in any conventional manner, such as by rivets, welding, etc.

The method of retrofitting the top 2 to an existing cooking pot comprises forming the top 2 with rim 5 and body portion 11 to fit an existing pot's rim 7. The top 2 can be provided with a support means, such as shown in FIG. 1–5 or 7, wherein the upper and lower raised portions 9, 10 are adapted to enable the top 2 to be supported on the pot's rim 7 right-side-up or up-side-down. The top's handles 13, 15 are preferably the same as the handles 16, 17 used on the existing pot. Since the handles don't have to engage each other, the top's handles 13, 15 do not have to be specially designed, i.e., the same off-the-shelf handles can be used. When the handles are extended at an angle, the top's handles 13, 15 are preferably oriented in the same manner as the pot's handles 16, 17 when the top 2 is right-side-up, and in the reverse orientation when the top 2 is up-side-down.

Although the preferred embodiments are discussed above, the present invention is, nevertheless, intended to encompass embodiments that are not specifically disclosed, but which fall within the scope of the following claims:

What is claimed is:

1. A cooking system comprising:
    a cooking pot having an upper rim portion and two handles extending therefrom;
    a reversible colander comprising an upper rim portion adapted to fit on or within said pots rim portion when said colander is positioned on said pot in a first direction, a perforated body portion and an intermediate portion extending between said upper rim and body portions, wherein two handles are extended from said intermediate portion;
    wherein said two handles of said colander and said two handles of said pot are, with said colander positioned on said pot in said first direction, capable of being grasped with two hands, wherein said colander can be held securely on said pot in said first direction without regard to whether said two handles of said colander engage and/or mate with said two handles of said pot; and
    wherein said intermediate portion has upper and lower raised portions for supporting said colander on said pot in said first direction, and a second direction opposite said first direction, wherein said body portion is adapted to fit inside said pots upper rim portion when said colander is positioned on said pot in said second direction.

2. The cooking system of claim 1, wherein there is a space between said handles of said colander and said handles of said pot when said colander is positioned on said pot in said first direction, wherein pressure can be applied to hold said colander securely on said pot.

3. The cooking system of claim 1, wherein there is incidental contact between said handles of said colander and said handles of said pot when said colander is positioned on said pot in said first direction, wherein said incidental contact does not interfere with said colander's ability to be securely held on said pot.

4. The cooking system of claim 1, wherein said two handles of said colander and said two handles of said pot are substantially identical in shape.

5. The cooking system of claim 4, wherein said handles of said pot and said handles of said colander, with said colander positioned on said pot in said second direction, are angled in a first orientation, and, when said colander is positioned on said pot in said first direction, said handles of said colander are angled in a second orientation.

6. The cooking system of claim 1, wherein said intermediate portion has a center portion extending between said upper and lower raised portions, and said center portion has a diameter that is substantially the same as the diameter of said pot.

7. The cooking system of claim 1, wherein a lid is provided and adapted to fit onto said colander's rim portion and said pot's rim portion and centered thereon.

8. The cooking system of claim 1, further comprising a lid for said pot and said colander, wherein said lid has a rim portion with first, second and third annular portions, said annular portions having progressively smaller diameters, wherein said first annular portion is adapted to engage an inner surface of said pots upper rim when said lid is positioned on said pot, said second annular portion is adapted to engage said colander's upper rim portion when said lid is positioned on said colander, and said third annular portion is adapted to fit inside said upper rim portion of said colander when said lid is positioned on said colander.

9. A cooking system comprising:
    a cooking pot having an upper rim portion and two handles extending therefrom;
    a reversible colander comprising an upper rim portion adapted to fit on or within said pots rim portion when said colander is positioned on said pot in a first direction, a perforated body portion and an intermediate portion extending between said upper rim and body portions, wherein two hands are extended from said intermediate portion;
    wherein said two handles of said colander and said two handles of said pot are, with said colander positioned on said pot in said first direction, capable of being grasped with two hands, wherein said colander can be held securely on said pot in said first direction without regard to whether said two handles of said colander engage and/or mate with said two handles of said pot; and
    wherein said cooking system is adapted with one of the following structures:
        a) said intermediate portion has upper and lower ledge portions for supporting said colander on said pot in said first direction as well as a second direction opposite said first direction;
        b) said pot's rim portion is tapered, and said colander's upper rim and body portions are tapered, wherein said colander and pot are adapted such that there is a friction fit between them when said colander is positioned on said pot in said first direction, as well as a second direction opposite said first direction;
        c) said colander and said pot each have ledges for supporting said colander on said pot in said first direction, as well as a second direction opposite said first direction; or
        d) said colander's rim portion is adapted to fit externally of said pot's rim portion.

10. The cooking system of claim 9, further comprising a space between said colander's handles and said pots handles when said colander is positioned on said pat in said first direction, wherein said colander can be held tightly on said pot using said handles.

11. The cooking system of claim 9, wherein there is contact between said colander's handles and said pot's handles when said colander is positioned on said pot in said first direction.

12. A cooking system comprising:

a cooking pot having one or more handles and an upper rim portion with an inside surface thereon;

a reversible colander comprising an upper rim portion adapted to fit on or within said pot's upper rim portion, a perforated body portion, and an intermediate portion extending between said upper rim and body portions, said colander having one or more handles extending from said intermediate portion; and a lid capable of being positioned on said pot and said colander, wherein said lid has a rim portion with first, second and third annular portions, said annular portions having progressively smaller diameters, wherein said first annular portion has an engaging surface adapted to engage said inside surface of said pot's upper rim portion, when said lid is positioned on said pot, and wherein said second annular portion has an engaging surface adapted to engage an upper edge of said colander's upper rim portion when said lid is positioned on said colander, and wherein said third annular portion is adapted to fit inside said upper rim portion of said colander when said lid is positioned on said colander.

13. The cooking system of claim 12, wherein said inside surface of said pot's upper rim portion is curved and/or angled, and said first annular portion of said lid is similarly curved and/or angled, wherein said first annular portion engages said inside surface of said pot's upper rim portion in a manner that helps to center and substantially seal said lid on said pot.

14. The cooking system of claim 12, wherein said inside surface of said pot's upper rim portion is curved and/or angled, and said intermediate portion comprises upper and lower raised portions that are similarly curved and/or angled, wherein said upper and lower raised portions enable said colander to be securely positioned on said pot.

* * * * *